United States Patent [19]

Davis

[11] Patent Number: 5,239,668
[45] Date of Patent: Aug. 24, 1993

[54] SATELLITE SIGNALLING SYSTEM
[75] Inventor: Walter L. Davis, Coral Springs, Fla.
[73] Assignee: Motorola, Inc., Schaumburg, Ill.
[21] Appl. No.: 759,762
[22] Filed: Sep. 13, 1991

Related U.S. Application Data

[63] Continuation of Ser. No. 431,806, Nov. 6, 1989, abandoned.

[51] Int. Cl.$^5$ .................. H04B 7/185; H04B 7/00; H04Q 7/02
[52] U.S. Cl. .................. 455/12.1; 455/33.1; 455/38.2; 455/53.1; 455/54.1; 340/825.44; 342/376
[58] Field of Search .................. 455/12, 13, 33, 38, 455/53, 54, 12.1, 13.1, 13.3, 33.1, 33.3, 38.2, 38.5, 53.1, 54.1-54.2; 370/97, 18, 104; 342/350, 352, 355, 356, 376; 340/825.44; 343/DIG. 2

[56] References Cited

U.S. PATENT DOCUMENTS

| | | | |
|---|---|---|---|
| 3,772,475 | 11/1973 | Laffreder | 455/12 |
| 3,836,721 | 9/1974 | Sugioka | 455/12 |
| 4,145,573 | 3/1979 | Arnold | 179/15 BS |
| 4,145,658 | 3/1979 | Acampora et al. | 455/12 |
| 4,188,578 | 2/1980 | Rendenk et al. | 370/97 |
| 4,268,831 | 5/1981 | Valentino et al. | 342/376 |
| 4,489,325 | 12/1984 | Bauck et al. | 342/376 |
| 4,518,916 | 5/1985 | Davis et al. | 340/825.44 |
| 4,595,926 | 6/1986 | Kobus et al. | 342/368 |
| 4,628,506 | 12/1986 | Sperlich | 455/12 |
| 4,644,347 | 2/1987 | Lucas et al. | 455/34 |
| 4,682,165 | 7/1987 | Davis | 340/825.44 |
| 4,689,625 | 8/1987 | Barmat | 342/356 |
| 4,901,307 | 2/1990 | Gilhousen et al. | 370/18 |

FOREIGN PATENT DOCUMENTS 3706240A 9/1988 Fed. Rep. of Germany .
WO87/02191 4/1987 PCT Int'l Appl. .

OTHER PUBLICATIONS

An Integrated Satellite-Cellular Land Mobile System for Europe, Envico Del Re, University of Florence Received in Group 260 Sep. 21, 1989.
Proceeding of the 8th European Microwave Conference, Paris France (Sep. 4-8, 1978), D. O. Reudink et al., "A High Capacity Satellite Utilizing Fixed and Scanning Spot Antenna Beams".

Primary Examiner—Reinhard J. Eisenzopf
Assistant Examiner—Lisa Charouel
Attorney, Agent, or Firm—Daniel R. Collopy; William E. Koch; Thomas G. Berry

[57] ABSTRACT

This invention relates to a satellite signalling system. A ground station receives paging signals from an earthbound terminal, and an up-link radio transmitter/antenna transmits paging signals and control signals to a satellite in earth orbit. An up-link receiver coupled to the satellite receives the paging and control signals. A down-link transmitter is coupled to an antenna whose beam may be directed in a predetermined sequence to a plurality of locations on earth as paging signals are transmitted to earth.

13 Claims, 9 Drawing Sheets

SATELLITE SIGNALLING SYSTEM

This is a continuation of application Ser. No. 07/431,806, filed Nov. 6, 1989 now abandoned.

FIELD OF THE INVENTION

This invention relates to satellite signalling systems having signal coverage over a very wide area. The present invention is particularly, though not exclusively, concerned with a satellite signalling system such as may be used in a satellite paging system.

This invention is related to U.S. Pat. No. 5,121,503 entitled "Satellite Signalling System Having a Signal Beam with a Variable Beam Area", issued Jun. 9, 1990 and assigned to the assignee of the present invention.

BACKGROUND OF THE INVENTION

The present state-of-the-art satellite paging systems comprise a fixed position antenna mounted on a satellite in synchronous orbit. Typically in such systems, the antenna and the beam pattern of the antenna are both fixed so that the spot or the "footprint" of the signal beam covers that portion of the globe which is "visible" to the satellite; that is, approximately one-third of the earth's surface.

The ground level strength of the signal transmitted by the antenna is fairly uniform across the covered area; however, the signal strength is very weak. This creates a problem, even for the highest powered synchronous satellites, since the ground level signal strength is too weak to allow for in-building paging coverage. For example, for a synchronous satellite with a radiated power of 400 watts, a state-of-the art selective call paging receiver using the POCSAG paging protocol at a bit rate of 512 bits per second would only have 2 dB of signalling margin; that is, the average signal strength on the ground would be only 2 dB above the minimum level to activate a paging device. One solution would be to use low bit rate signals of 60 baud or less to reduce the bandwidth of the paging receiver. However, this makes the paging system extremely expensive and impractical in view of the small number of users that can be serviced by the paging system. That is, the low bit rate could only support a small volume of paging traffic.

Thus, it is an object of the present invention to provide an improved satellite signalling system wherein the above disadvantages are overcome or at least alleviated.

SUMMARY OF THE INVENTION

In carrying out the objects of the invention, in one form there is provided a satellite signalling system comprising an antenna having a steerable beam and a first receiver for receiving paging information and control information, the control information for controlling the antenna. A first transmitter is coupled to the antenna and the first receiver for transmitting a paging signal corresponding to the paging information, wherein the paging signal comprises a data signal having a plurality of signal batches arranged in a sequence. A control means is coupled to the antenna and the first receiver for controlling the antenna to sequentially direct the steerable beam to a plurality of locations in response to the control information, wherein each of the plurality of signal batches corresponds to one of the plurality of locations. The control means directs the steerable beam in response to the control information to one of the plurality of locations corresponding to one of the plurality of signal batches at a time that the one of the plurality of signal batches is being transmitted by the first transmitter.

In another form there is provided a method for satellite signalling from a ground station system terminal to a plurality of communication receivers located in a plurality of locations on earth. The method comprises the steps of transmitting a signal comprising satellite control information and a batch of communication information from the ground station system terminal, receiving the signal at a first antenna coupled to a satellite orbiting earth, aiming a second antenna coupled to the satellite at one of said plurality of locations in response to the satellite control information, and providing a signal beam having a footprint having an area from the second antenna, the area being determined in response to the satellite control information. The method further comprises the steps of powering up ones of the plurality of communication receivers located in the one of the plurality of locations, transmitting a communication signal comprising the batch of communication information from the second antenna to the one of the plurality of locations, receiving the communication signal comprising the batch of communication information by the ones of the plurality of communication receivers, and powering down the ones of the plurality of communication receivers. The steps of the method are then repeated for a next of the plurality of locations.

DETAILED DESCRIPTION OF THE PREFERRED EMBODIMENT

Figure 1:
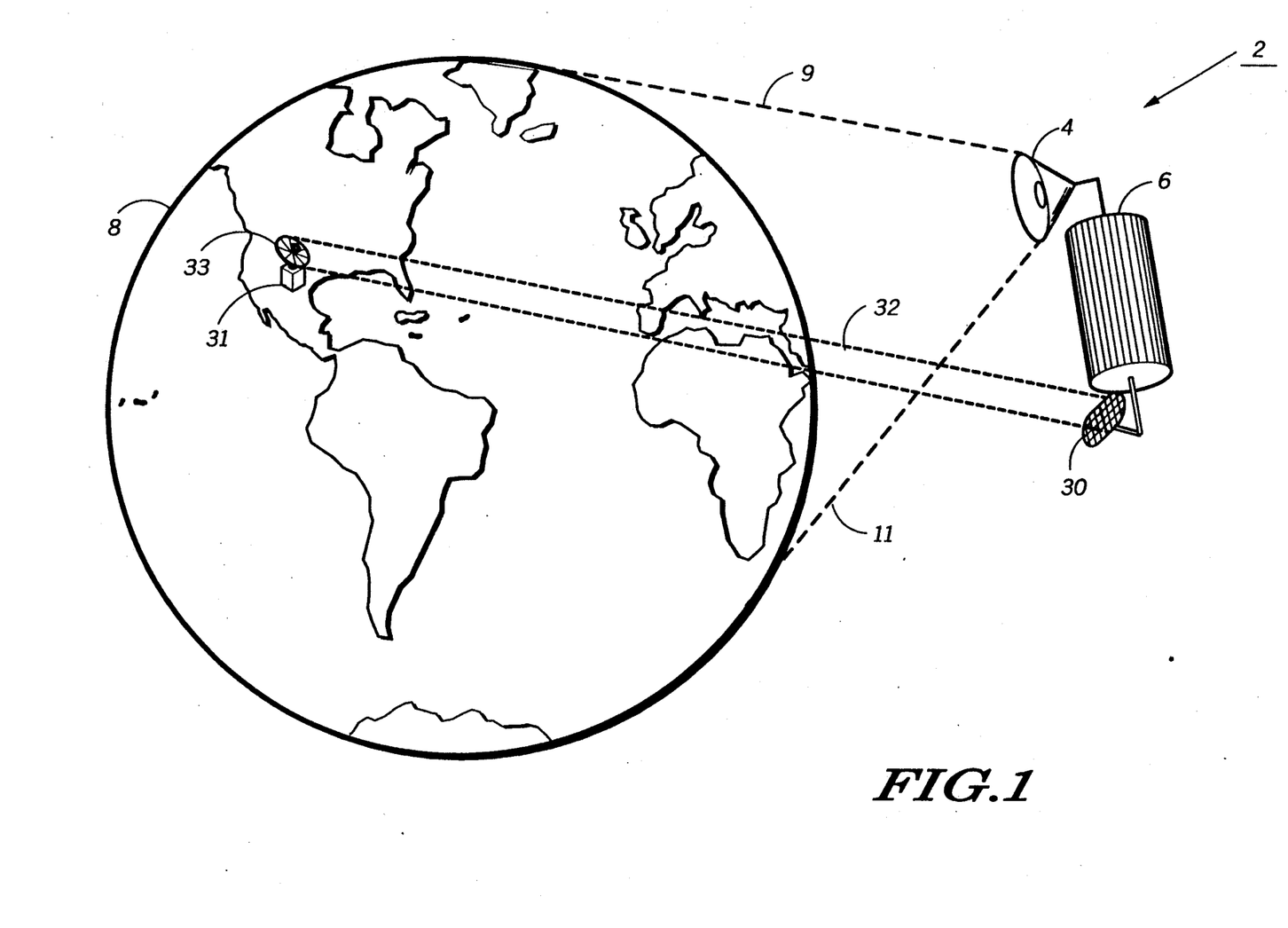
FIG. 1 is a diagram of a prior art satellite paging system.

Referring firstly to FIG. 1, a prior art satellite paging system 2 comprises a fixed antenna 4 mounted on a satellite 6 in synchronous orbit around the earth 8. The operation of the antenna 4 is controlled by the satellite 6.

The antenna 4 is arranged so that the signal beam 10 (whose periphery is represented by the dotted lines 9 and 11) transmitted from the antenna 4 has a beam area which covers the portion of the earth's surface which is "visible" to the satellite 4. The beam is generally a spot beam. As has been stated above, the satellite paging system 2 cannot provide in-building paging coverage unless the data rate is reduced to approximately 60 baud or less since the signal strength at the earth's surface is very weak.

Paging signals from a ground based terminal 31 are transmitted via antenna 33 to a receiving antenna 30 on satellite 6. This is represented by radio frequency (RF) up-link 32.

Figure 2:
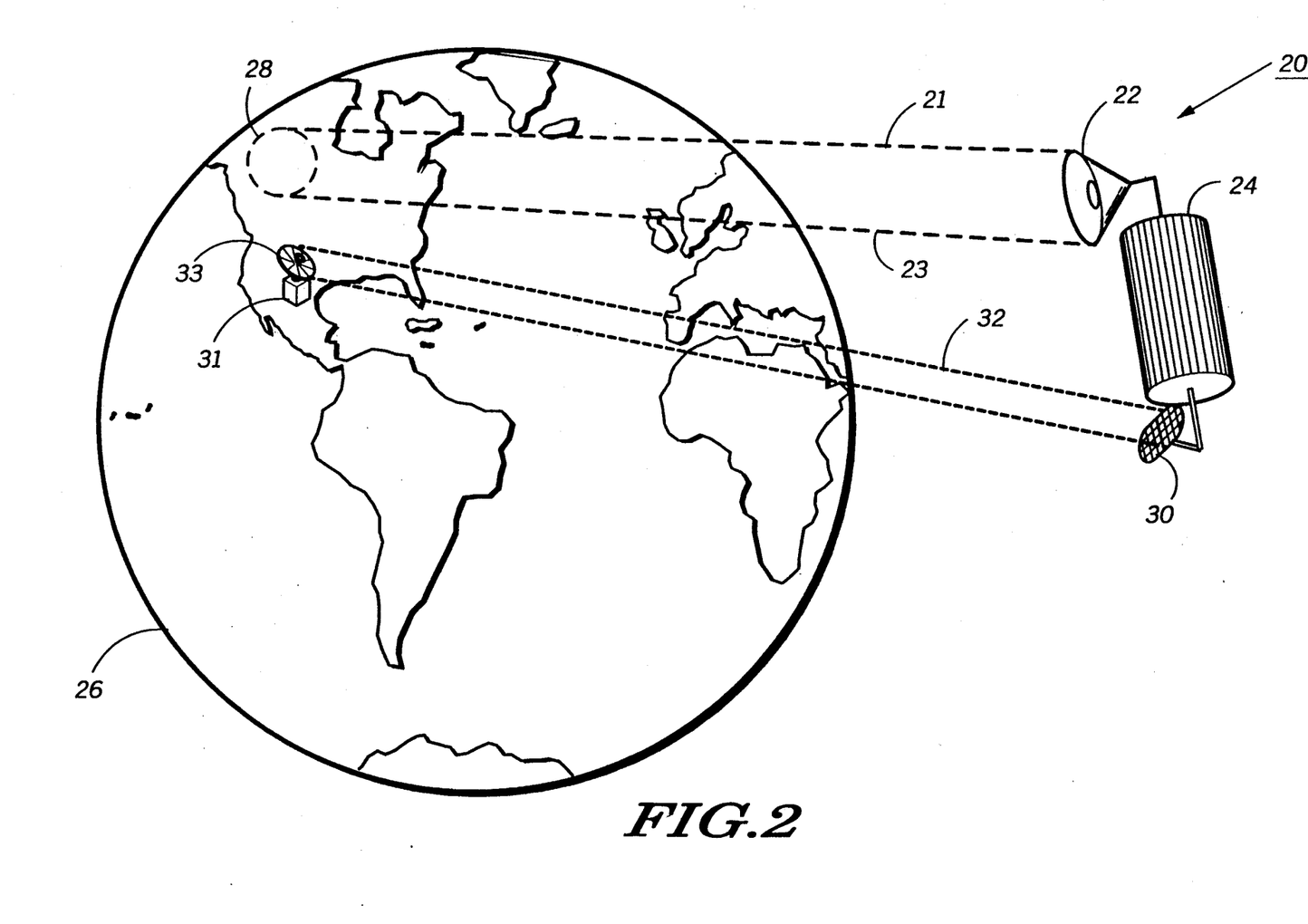
FIG. 2 is a diagram of a satellite paging system in accordance with the present invention.

Referring now also to FIG. 2, in order to circumvent the above described problems, a satellite paging system 20 according to a preferred embodiment of the present invention comprises a movable or steerable antenna 22 mounted on a satellite 24 in synchronous orbit around the earth 26. The movement and operation of the movable antenna 22 is controlled by the satellite 24.

The movable antenna 22 is arranged so that the transmitted signal beam 27 (represented by dotted lines 21 and 23 in FIG. 2) has a small enough beam area, which is in the preferred embodiment the spot area 28, to provide sufficient signal strength at the earth's surface to allow for in-building paging coverage. Since the ground level signal strength varies as approximately the second power of the radius of the beam on the earth, reducing the radius by a factor of ten from 8,000 miles to 800 would provide 100 times, or 20 dB, more ground level signal. For example, a synchronous satellite with 400 watts of effective radiation power (ERP) and a spot beam diameter of 800 miles would produce a ground level signal strength that is 22 dB above the threshold for 512 baud POCSAG signalling. This is sufficient to provide good in-building paging coverage.

The steerable antenna 22 can be moved by the satellite 24 so that the spot area 28 can be directed towards specific geographical locations on the earth's surface, and thus the satellite 24 can scan the whole portion of the earth's surface which is "visible" to the satellite 24. The movable or steerable antenna 22 scans each of the geographical locations in a predetermined sequence and for a predetermined time. The techniques for implementing an electronically steerable antenna are well known in the antenna art and are not duplicated here. For example see U.S. Pat. Nos. 4,489,325 and 4,595,926.

The satellite paging system, according to the present invention, operates in the following manner.

Figure 3:
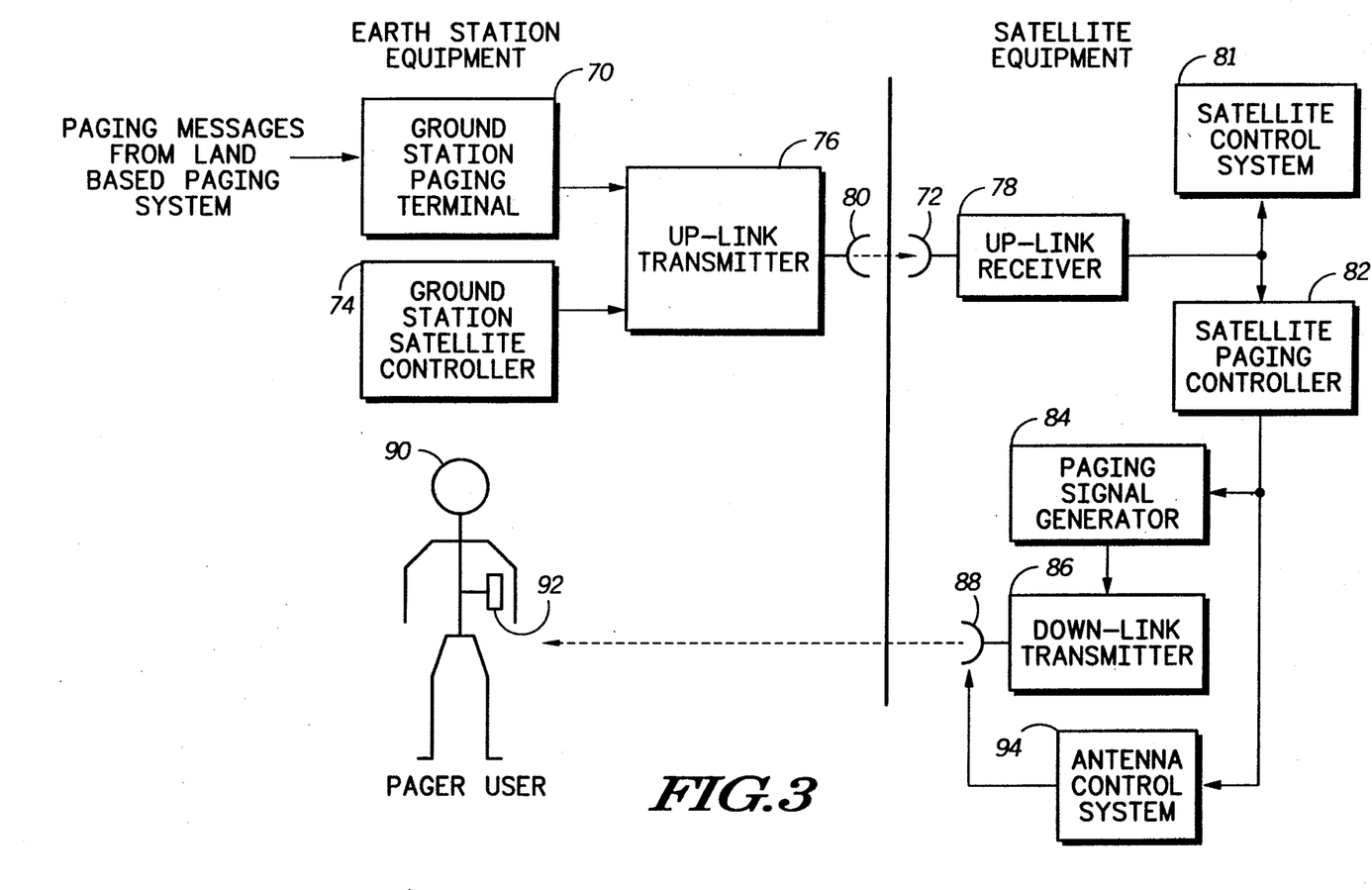
FIG. 3 is a diagram illustrating the operation of the inventive satellite paging system.

Referring to FIG. 3, paging signals from ground base terminal 70 and control signals from a ground station satellite controller 74 are applied to up-link transmitter 76. Up-link signals, consisting of paging data signals and signals required to control the operation of the satellite which in turn control the operation of movable antenna 72, are transmitted from up-link transmitter 76 to up-link receiver 78 via transmitting antenna 80 and receiving antenna 72. It should be appreciated that up-link data can be transmitted at a much higher data rate than that used for down-link transmissions.

The output of up-link receiver 78 is coupled to satellite control system 81 and satellite paging controller 82. A paging signal generator 84 receives information and control signals from satellite paging controller 82 and transmits paging information of a type previously described via down-link transmitter 86 and movable antenna 88 to a pager user 90 carrying paging receiver 92.

Movable antenna 88 is directed by an antenna control system 94 coupled to satellite paging controller 82 to scan specific geographic locations on the earth's surface in a predetermined sequence and for a predetermined time. When the beam of movable antenna 88 is directed at a particular location, down-link transmitter 86 will transmit paging signals in the batch form described below and corresponding to the specific location during the time slot assigned to that location via paging signal generator 84.

The pagers in the paging system operate to synchronize their battery savers to the appropriate batch in the signal transmissions from the satellite using the synchronization code of the appropriate signal as will be described herein below. Once the pager has been synchronized and addressed, it will decode the paging signals.

Figure 4:
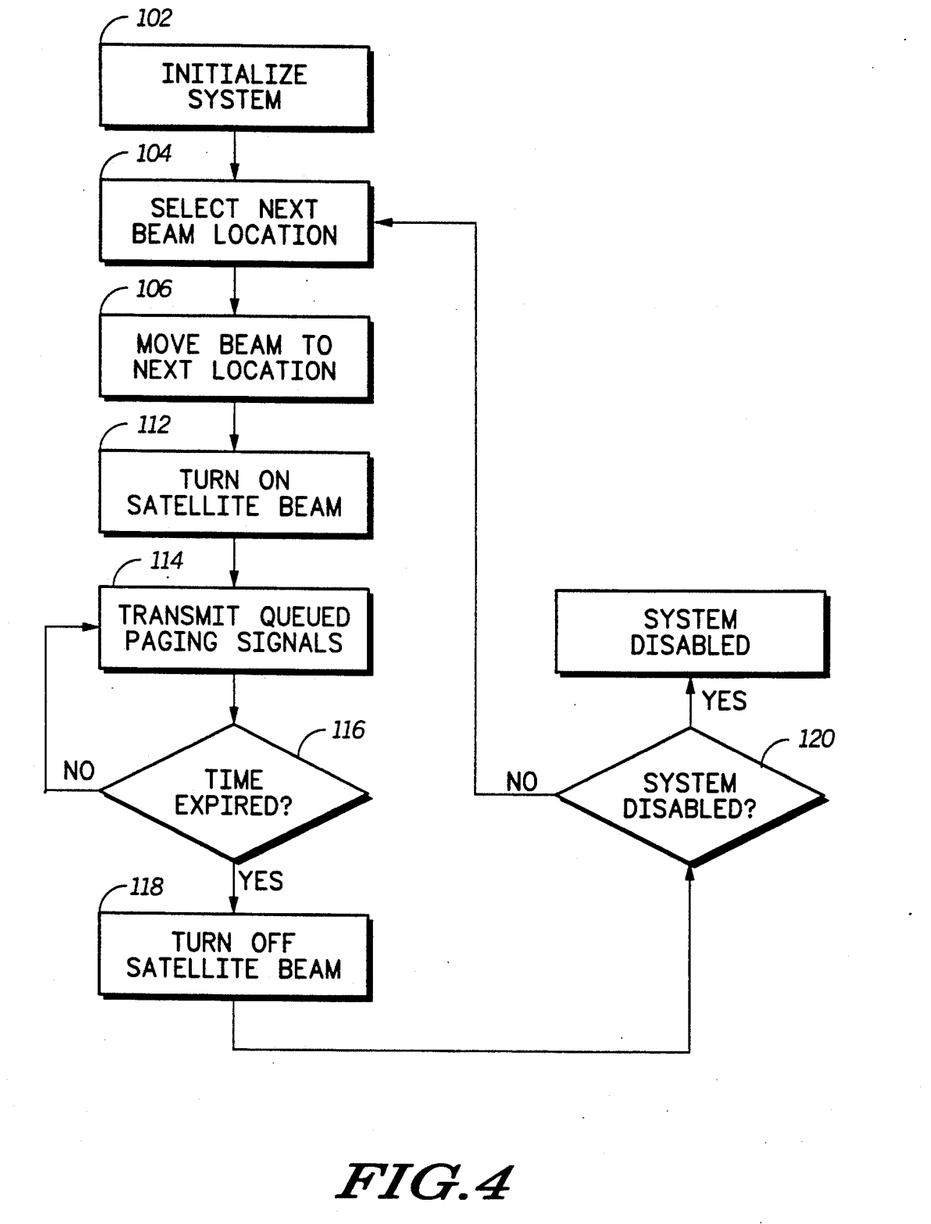
FIG. 4 is a flow chart which illustrates satellite beam operation.

FIG. 4 is a flow chart which describes the satellite beam steering operation. After the system has been initialized (102), the next beam location is selected (104). The beam is moved to the selected location (106) and the satellite beam activated (112). The paging signals which are to be directed to that specific location are then transmitted (114) for a predetermined period of time (116). When time has elapsed, the satellite beam is turned off (118) and if the system is not disabled (120), the next beam location is selected (104).

Figure 5A:
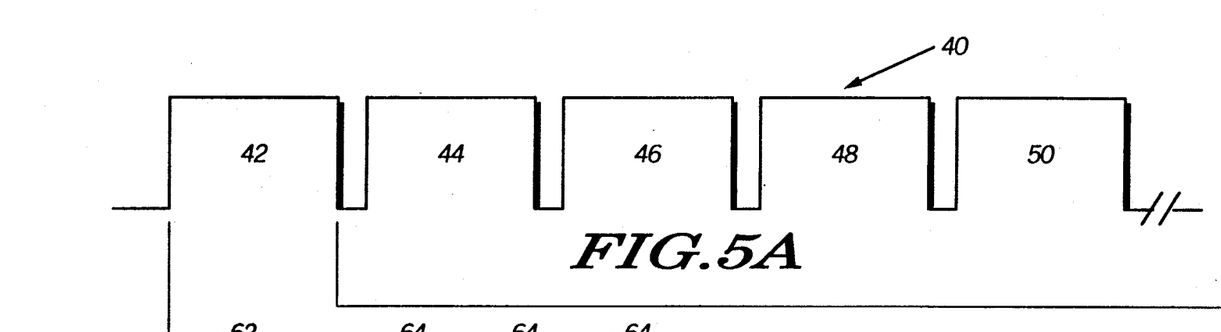
FIGS. 5A-5C are diagrams illustrating batches of signals transmitted the by inventive satellite paging system.

FIG. 5A shows an exemplary representation 40 of the signals transmitted from the satellite antenna 88. The signal 40 is a time-division multiplexed binary paging signal and comprises a sequence of batches 42–50. Each of the batches 42–50 corresponds to a specific geographical location within the scanning area covered by the satellite 24. For example, batch 42 may correspond to New York, batch 44 Boston, batch 46 Chicago, etc. Each batch is transmitted to the appropriate location on a sequential basis. For purposes of example, the POCSAG signalling protocol is used for the signalling format in each batch.

Figure 5B:
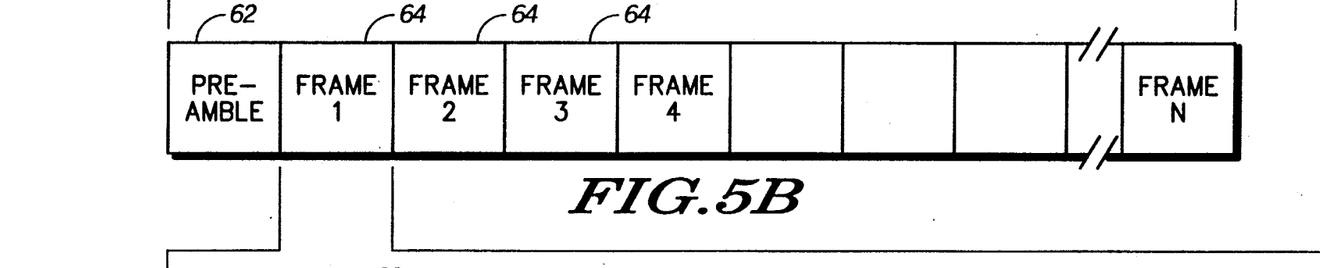

FIG. 5B illustrates that each batch (e.g., 42) comprises a preamble 62 followed by N frames 64.

Figure 5C:
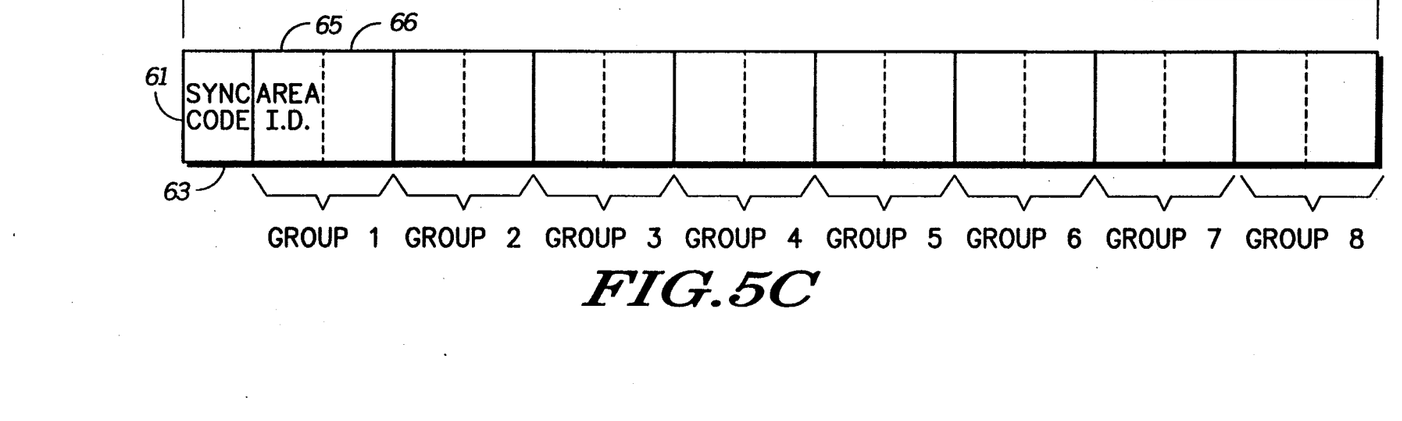

Finally, FIG. 5C shows an exemplary representation 61 of one of the frames 64 in FIG. 5B. The frame 61 comprises a synchronization code 63 followed by a unique area identification code 65 that corresponds to the geographical location covered by the batch transmission. The identification code 65 is followed by address signals 66 for addressing a predetermined pager.

The format of the frame 61 enables the operation of the battery savers in the pagers to be synchronized to the scanning sequence of the movable antenna 24 by using the synchronization code 63. A pager operating within a particular geographical location, once it has been synchronized, will only be powered up in order to decode paging signals if the satellite 24 is transmitting to its geographical location. This provides for good pager battery life.

In addition, the identification code 65 of the frame 61 identifies the current operating location to the pager. Thus, if the pager is outside its normal operating area, the identification code 65 provides the pager with location information which can be displayed on a display or can be used to enable different operating modes of the pager, for example, the "roaming" mode.

Figure 6:
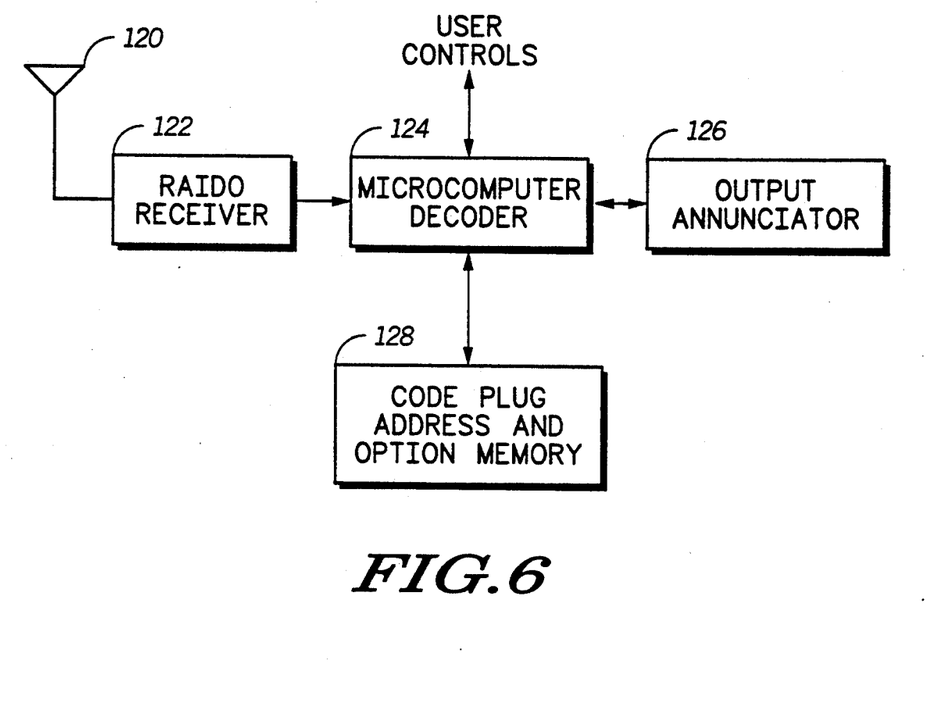
FIG. 6 is a block diagram of a typical paging receiver suitable for use in conjunction with the inventive satellite paging system.

FIG. 6 is a block diagram of a paging receiver suitable for use within the inventive satellite paging system. It is a conventional selective call paging receiver which includes a radio receiver 122 which receives signals via antenna 120. The output of radio receiver 122 is applied to a microcomputer decoder 124 which processes the information contained in the received signals. As can be seen, microcomputer decoder 120 communicates with output annunciator 126, code plug address and option memory 128, and the user controls on the pager. The operation of a paging receiver of the type shown in FIG. 6 is well known and is described in U.S. Pat. No. 4,518,961 issued May 21, 1985, entitled "Universal Paging Device with Power Conservation."

Figure 7A:
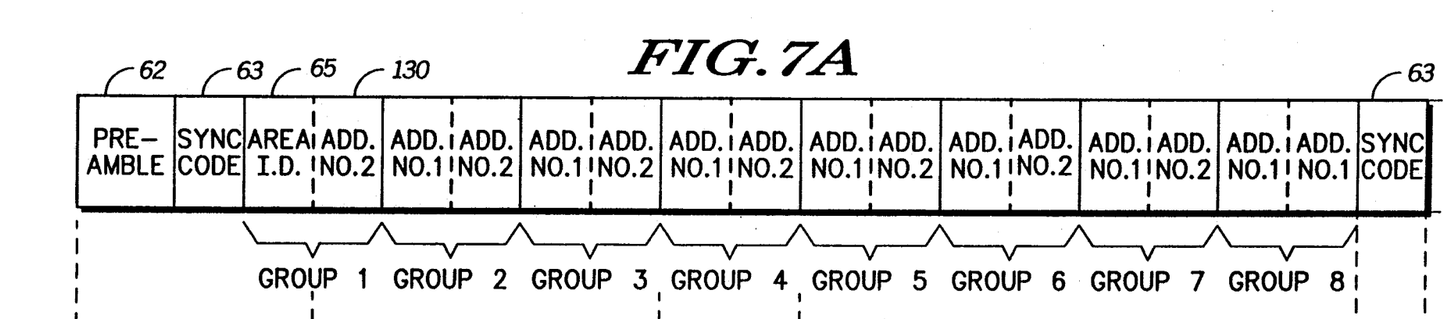
FIGS. 7A-7B are timing diagrams illustrating the operation of the battery saver circuit in the paging receiver shown in FIG. 6.
Figure 7B:
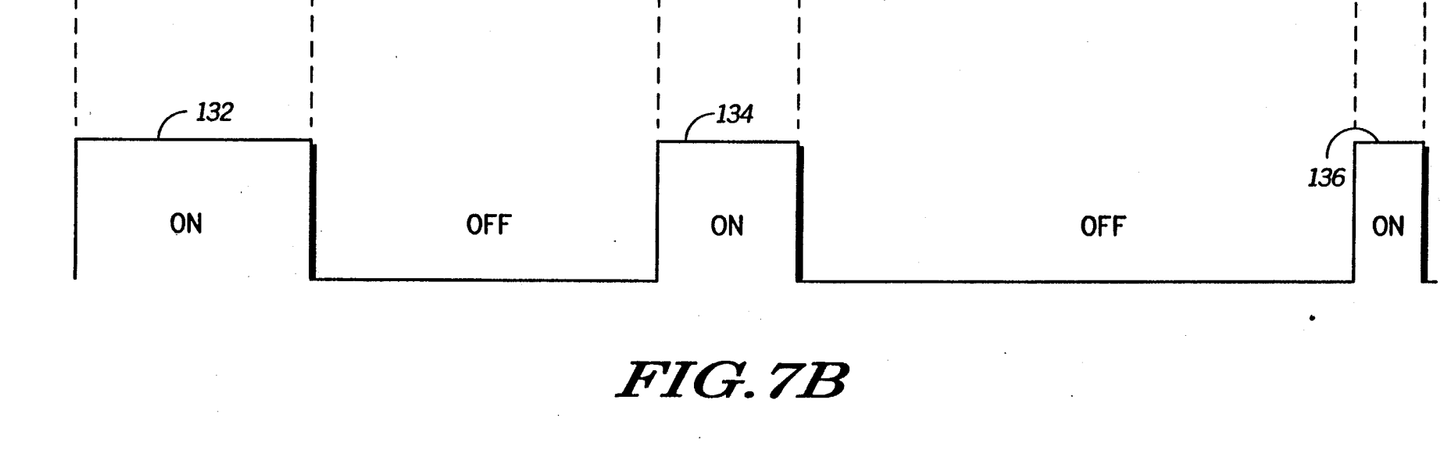

To function within the inventive satellite paging system, microprocessor decoder 124 is programmed to decode the signalling protocol shown in FIGS. 5A, 5B, and 5C. Specifically, the decoder is programmed to search for a signal from the satellite and then to synchronize its decoding operations to the timing of the motion of the beam. To synchronize to the signalling waveform, the decoder first remains on until it decodes the down link signal. It then synchronizes its decoding operation with the received signal using well-known synchronization techniques. Having done this, the receiver then synchronizes the operation of its own battery saving circuits with the predetermined timing of the down link transmission of the satellite using information that can be contained in either the program ROM of the microcomputer decoder or in the code plug and option memory. As a result, the receiver battery savers only activate the pager during the intervals when the satellite is transmitting to the geographic area in which the pager resides. For example, FIG. 7A again shows preamble 62 followed by a synchronization code 63 which is in turn followed by an area identification portion 65 in batch 42 (FIG. 5A). The area identification portion 65 and an address number 2 130 form what is referred to as GROUP 1. Each subsequent group contains first and second addresses as is shown in FIG. 7A. Synchronizaton code 63 is repeated after the eighth group. Thus, if the receiver is programmed to respond to the GROUP 4 addresses, the battery saver circuits in the receiver will only activate the pager during its search operation 132 during which time the receiver will search for preamble 62 and synchronization code 63, during time interval 134 when the GROUP 4 addresses are being transmitted, and then again during each synchronization code interval 136. This is shown in FIG. 7B. Of course, the page is not activated during batches 44, 46, 48, and 50 corresponding to other geograhical locations.

Figure 8A:
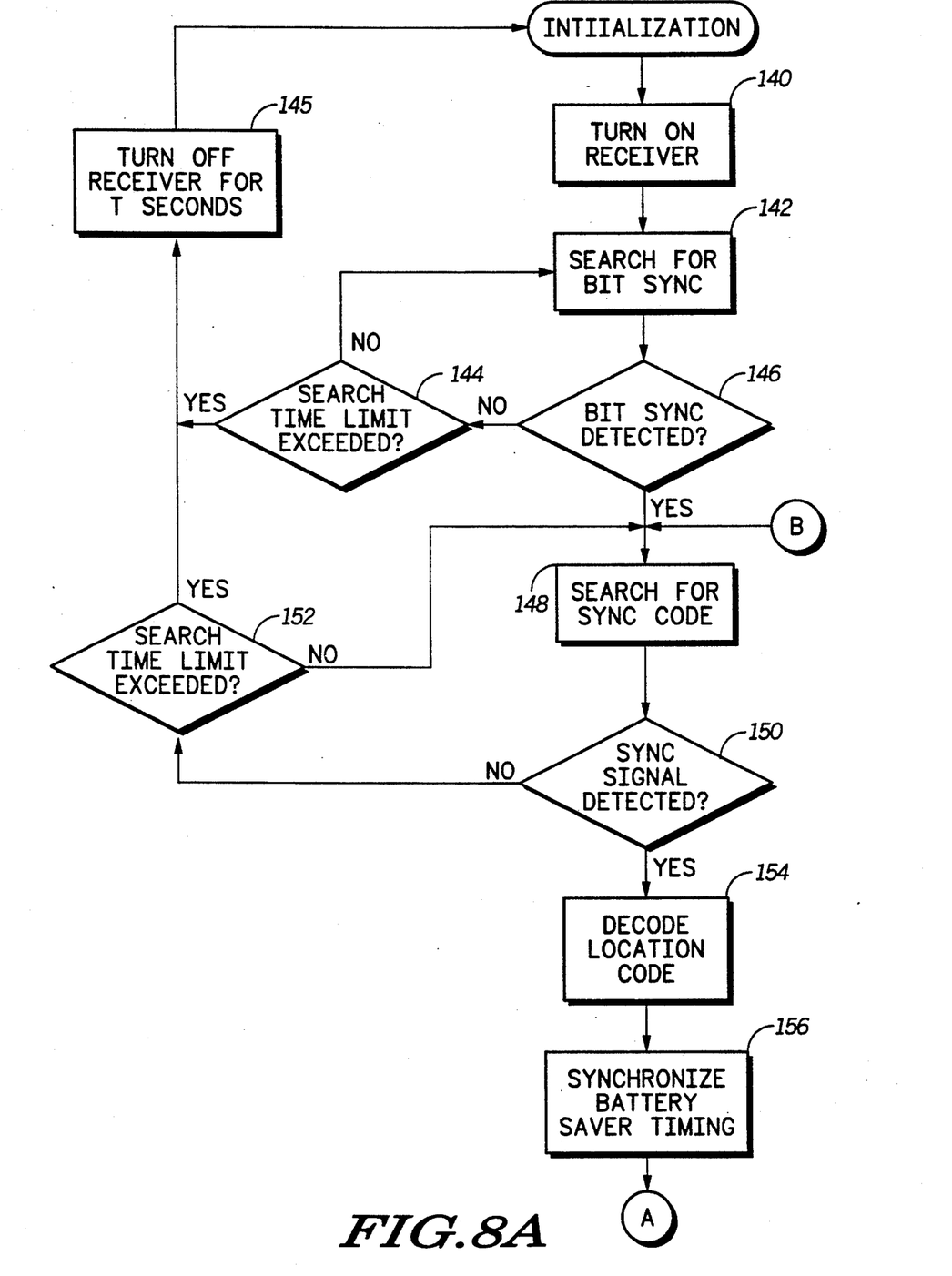
FIGS. 8A-8B are flow charts which describe the operation of the pager in FIG. 6.
Figure 8B:
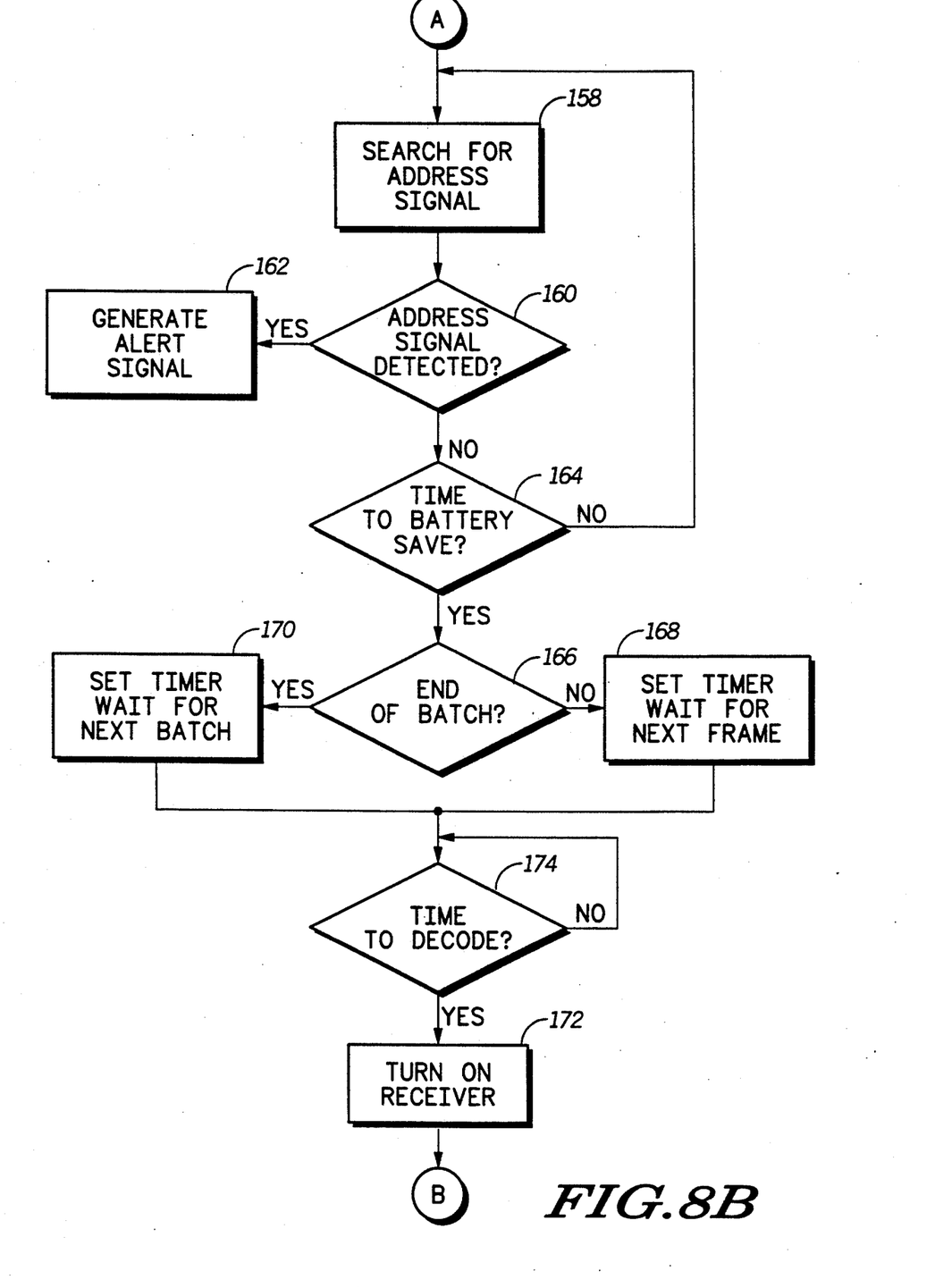

FIGS. 8A and 8B are flow charts which describe the operation of the receiver. After initialization, the receiver is turned on (140) and searches for the bit synchronization code (142) for a predetermined search period (144) after which the receiver is turned off (145). If bit synchronization is achieved prior to termination of this predetermined search period (146), the receiver will begin its search for the synchronization code (148). Again, assuming the synchronization code is detected (150) prior to the expiration of a predetermined search period (152), the location code will be decoded (154) and the battery saver timing circuitry synchronized (156). The receiver will then begin searching for an address signal (158). Should an address signal be detected (160), an alert signal will be generated (162). If an address signal is not detected (160), the receiver will continue to search for an address signal until the battery saver timing circuits indicated that it is time to battery save (164). If an end of batch has not been detected (166), the timer will be set to wait for the next frame (168). If an end of batch has been detected, a timer will reset to wait for the next batch (170). In either case, the receiver will be turned on (172) after an appropriate time (174).

It will be appreciated that by making use of a steerable antenna, the claimed invention can provide practical in-building paging coverage over a very wide area. In addition, the scanning operation of the beam can be used to provide wide area coverage, as well as to prolong paper battery life when the operation of the pager battery saver is synchronized to the movement of the beam.

It will be further appreciated that the claimed invention could be used to provide true nationwide or continent-wide paging coverage. In addition, it would also be used in conjunction with existing land-based paging systems to provide for true nationwide coverage when a paging subscriber leaves his usual geographical location.

What is claimed is:

1. A satellite signalling system comprising:
    a satellite orbiting earth;
    an antenna coupled to said satellite for providing a signal beam, said signal beam having a small beam area and comprising a data signal beam having a plurality of signal batches arranged in a first sequence, said satellite being arranged to control the position of said antenna;
    means coupled to said antenna for directing said signal beam in a second sequence to a plurality of locations on the earth, wherein each of said plurality of signal batches corresponds to one of said plurality of locations and said second sequence of the plurality of locations is determined in response to the first sequence of the plurality of signal batches such that said signal beam comprising one of said plurality of signal batches is provided from said antenna when said directing means directs said signal beam to one of said plurality of locations corresponding to said one of said plurality of signal batches; and
    a portable selective signal receiver located within one of said plurality of locations for receiving said signal beam, said portable selective signal receiver being powered up to receive one of said plurality of batches, wherein said one of said plurality of batches corresponds to said one of said plurality of locations.

2. The satellite signalling system according to claim 1 wherein said small beam area is no greater than 800 square miles.

3. The satellite signalling system according to claim 1 wherein said each of said plurality of signal batches comprises an identification code identifying the corresponding one of said plurality of locations and wherein said portable selective signal receiver comprises means for decoding said signal beam, said decoding means determining the receiver's location in response to said identification code.

4. A satellite signalling system comprising:
    an antenna having a steerable beam,
    a first receiver for receiving paging information and control information, said control information for controlling the antenna;
    a first transmitter coupled to said antenna and said first receiver for transmitting a paging signal corresponding to said paging information, wherein said paging signal comprises a data signal having a plurality of signal batches arranged in a sequence; and
    control means coupled to said antenna and said first receiver for controlling said antenna to sequentially direct said steerable beam to a plurality of locations in response to said control information, wherein each of said plurality of signal batches corresponds to one of said plurality of locations and wherein said control means directs said steerable beam in response to said control information to one of said plurality of locations corresponding to one of said plurality of signal batches at a time that the one of said plurality of signal batches is being transmitted by said first transmitter.

5. The satellite signalling system according to claim 4 further comprising a second transmitter for transmitting said paging information and control information to said first receiver.

6. The satellite signalling system according to claim 4 further comprising at least one selective call receiver for receiving said paging signal in at least one of said plurality of locations.

7. The satellite signalling system according to claim 6 wherein each of said plurality of signal batches has an identification code for identifying one of said plurality of locations and said at least one selective call receiver comprises decoding means for decoding said identification code.

8. The satellite signalling system according to claim 6 wherein said at least one selective call receiver in said at least one of said plurality of locations responds only to the one of said plurality of signal batches corresponding to said at least one of said plurality of locations.

9. A satellite paging system comprising:
  a satellite;
  first means for transmitting paging information to said satellite;
  second means coupled to the satellite for transmitting paging signals derived from said paging information, the paging signals comprising a plurality of signal batches arranged in a first sequence, the paging signals transmitted from said satellite to a plurality of locations arranged in a second sequence, each of said plurality of signal batches corresponding to a corresponding one of said plurality of locations such that each of said plurality of signal batches is transmitted to the corresponding one of said plurality of locations; and
  at least one pager receiver residing in one of said plurality of locations, each of said at least one pager receiver selectively responding to only the one of said plurality of signal batches corresponding to the one of said plurality of locations in which the each of said at least one pager receiver resides.

10. The satellite paging system according to claim 9 wherein each of said plurality of signal batches corresponding to the corresponding one of said plurality of locations includes an identification code for identifying the corresponding said one of said plurality of locations.

11. The satellite paging system according to claim 9 wherein said second means includes a moveable antenna for providing a signal beam having a small beam area, said antenna being positioned for directing the signal beam to said plurality of locations in said second sequence.

12. A satellite paging system comprising:
  a ground station comprising:
    receiving means for receiving selective call messages comprising receiver identification codes and receiver location codes;
    encoding means for encoding said selective call messages into paging signal batches, each of the paging signal batches comprising a portion of said selective call messages, each of the portion of said selective call messages having equivalent receiver location codes; and
    up-link transmission means for transmitting satellite control signals and said paging signal batches;
  a satellite comprising:
    up-link receiving means for receiving said paging signal batches and said satellite control signals;
    transmission means for transmitting said paging signal batches to geographic locations; and
    control means coupled to said up-link receiving means and said transmission means for determining which one of the geographic locations correspond to one of the paging signal batches being transmitted in response to the satellite control signals and for causing said transmission means to broadcast the one of the paging signal batches to the one of the geographic locations; and
  a plurality of selective call receivers, each of the plurality of selective call receivers comprising:
    selective call receiving means for receiving said paging signal batches; and
    power conservation means for powering said selective call receiving means at a predetermined time when said satellite control signals indicate the transmitting means is broadcasting in the one of the geographic locations in which said each of the plurality of selective call receivers resides.

13. A method for satellite signalling from a ground station system terminal to a plurality of communication receivers located in a plurality of locations on earth comprising the steps of:
  (a) transmitting a signal comprising satellite control information and a batch of communication information from the ground station system terminal;
  (b) receiving said signal at a first antenna coupled to a satellite orbiting earth;
  (c) aiming a second antenna coupled to the satellite at one of said plurality of locations in response to said satellite control information;
  (d) providing a signal beam having a footprint having an area from said second antenna, said area being determined in response to said satellite control information;
  (e) powering up ones of said plurality of communication receivers located in said one of said plurality of locations;
  (f) transmitting a communication signal comprising said batch of communication information from said second antenna to said one of said plurality of locations;
  (g) receiving said communication signal comprising said batch of communication information by said ones of said plurality of communication receivers;
  (h) powering down said ones of said plurality of communication receivers; and
  (i) repeating steps (a) to (h) for a next of said plurality of locations.

* * * * *